(12) United States Patent
Hudson et al.

(10) Patent No.: US 11,136,940 B2
(45) Date of Patent: Oct. 5, 2021

(54) HYDRAULIC THRUST REVERSER ACTUATION SYSTEM

(71) Applicant: Goodrich Actuation Systems Limited, Solihull West Midlands (GB)

(72) Inventors: Tim Hudson, Crickmerry (GB); Brett Wharton, Wolverhampton (GB)

(73) Assignee: GOODRICH ACTUATION SYSTEMS LIMITED, Solihull West Midland (GB)

(*) Notice: Subject to any disclaimer, the term of this patent is extended or adjusted under 35 U.S.C. 154(b) by 5 days.

(21) Appl. No.: 16/711,897

(22) Filed: Dec. 12, 2019

(65) Prior Publication Data

US 2020/0378342 A1 Dec. 3, 2020

(30) Foreign Application Priority Data

May 31, 2019 (EP) .................................. 19177725

(51) Int. Cl.
   *F02K 1/76* (2006.01)
   *F15B 15/26* (2006.01)
   *F15B 11/08* (2006.01)

(52) U.S. Cl.
   CPC .............. *F02K 1/763* (2013.01); *F15B 11/08* (2013.01); *F15B 15/26* (2013.01); *F02K 1/766* (2013.01); *F15B 2015/268* (2013.01)

(58) Field of Classification Search
   CPC ...... F02K 11/763; F02K 11/766; F02K 11/76; F02K 1/763; F02K 1/766; F02K 1/76
   See application file for complete search history.

(56) References Cited

U.S. PATENT DOCUMENTS

| | | | | |
|---|---|---|---|---|
| 3,895,779 | A | * | 7/1975 | Cassez ..................... B66D 1/08 254/361 |
| 4,391,409 | A | * | 7/1983 | Scholz ...................... F02K 1/72 239/265.29 |
| 5,381,654 | A | | 1/1995 | Halin |
| 10,227,951 | B2 | | 3/2019 | Kopeck |
| 2004/0068977 | A1 | | 4/2004 | McKay |
| 2015/0090810 | A1 | | 4/2015 | Lallement |
| 2018/0216573 | A1 | | 8/2018 | Kopecek |

FOREIGN PATENT DOCUMENTS

| | | |
|---|---|---|
| EP | 1398493 B1 | 3/2004 |
| EP | 1602833 B1 | 12/2005 |

OTHER PUBLICATIONS

European Search Report for Application No. 19177725.9, Search completed Nov. 21, 2019, 6 pages.

* cited by examiner

*Primary Examiner* — Thomas E Lazo
*Assistant Examiner* — Michael Quandt
(74) *Attorney, Agent, or Firm* — Cantor Colburn LLP

(57) ABSTRACT

A hydraulic thrust reverser system (TRAS) including a first return line having a first check valve therein, and a second return line having a second check valve therein, wherein the first return line and the second return line are in fluid communication with each other via a fluid restrictor located upstream of the first and second check valves, wherein the first return line extends from a piston system of the TRAS, the piston system being for moving at least one thrust reverser door, and wherein the second return line extends from a lock system of the TRAS, the lock system being for controlling locks to selectively prevent the movement of the at least one thrust reverser door.

9 Claims, 2 Drawing Sheets

HYDRAULIC THRUST REVERSER ACTUATION SYSTEM

FOREIGN PRIORITY

This application claims priority to European Patent Application No. 19177725.9 filed May 31, 2019, the entire contents of which is incorporated herein by reference.

FIELD

The present invention relates to hydraulic thrust reverser actuation systems, and thrust reverser systems and aircraft including such hydraulic thrust reverser systems.

BACKGROUND

Thrust reversers are moving sections of an engine nacelle which, when opened, divert a portion of engine "forward thrust" to "reverse thrust". The thrust reverser actuation system (TRAS) is an integral part of the thrust reversers, and provides the motive force to translate the moving sections of the nacelle. The major purpose of thrust reversers is to aid wheel brakes in decelerating an aircraft after landing, to reduce the stopping distance of the aircraft. Thrust reversers provide increased control on wet, icy and slippery runways where wheel brakes are less effective, and aid in providing reduced stopping distances suitable for shorter runways. For example, for a mid-sized aircraft, the stopping distance may be reduced from around 3600 m to around 1200 m with the aid of reverse thrust.

SUMMARY

According to a first aspect, a hydraulic thrust reverser system (TRAS) includes a first return line having a first check valve therein, and a second return line having a second check valve therein, wherein the first return line and the second return line are in fluid communication with each other via a fluid restrictor located upstream of the first and second return line check valves, wherein the first return line extends from a piston system of the TRAS, the piston system being for moving at least one thrust reverser door, and wherein the second return line extends from a lock system of the TRAS, the lock system being for controlling locks to selectively prevent the movement of the at least one thrust reverser door.

The first and second return lines may be first and second hydraulic fluid return lines.

The piston system and the lock system are located at an upstream end of the respective first and second return lines. The TRAS may further comprise an outlet. The outlet may be in fluid communication with both the first return line and the second return line downstream of the first and second return line check valves. I.e., the first return line may extend from the piston system to the outlet, and the second return line may extend from the lock system to the outlet. Alternatively, the first return line may extend from the piston system to the outlet, and second return line may extend from the lock system to an additional outlet.

The lock system may be a second piston system.

The first return line is in fluid communication with the piston system such that fluid in the system can leave the system via the first return line (i.e. fluid can flow therefrom, such as to an outlet, via the first return line).

The second return line is in fluid communication with the lock system such that fluid in the system can leave the system via the second return line (i.e. fluid can flow therefrom, such as to an outlet, via the second return line).

The first and second return lines return fluid separately from the respective piston system or lock system. The first and second return lines extend from a fluid line of the respective system from which they extend. An end of the first return line is located adjacent and in fluid communication with the piston system, and an end of the second return line is located adjacent and in fluid communication with the lock system. Thus, fluid may flow from the piston system to the first check valve solely through the first return line, and fluid may flow from the lock system to the second check valve solely through the second return line.

The piston system may comprise pistons which can selectively actuate the thrust reversers of the TRAS. The piston system may also comprise actuator locks, which may selectively prevent the movement of the pistons. The lock system may comprise primary locks which can selectively prevent the thrust reversers from moving, such as by physically preventing the movement thereof.

The thrust reverser door may be any suitable moveable part of the TRAS that is arranged so as to divert engine air flow when deployed.

The first return line and the second return line may additionally be in fluid communication downstream of the first and second return line check valves.

The first and second return lines may converge to an outlet. The outlet may be in fluid communication with both the first return line and the second return line downstream of the first and second return line check valves. I.e., the first return line may extend from the piston system to the outlet, and the second return line may extend from the lock system to the outlet.

Alternatively, the first return line may extend from the piston system to the outlet, and second return line may extend from the lock system to an additional outlet.

Should the first check valve fail, fluid in the first return line will flow through the fluid restrictor to the second return line and thus through the second check valve, and vice versa. The restrictor may be the only flow path between the first and second return lines upstream of the check valves. However, the flow or depressurisation of the return line having the failed valve will occur at a slower rate than when the valve has not failed, due to the restricted path. A control system and/or an operator may monitor the time taken for the at least one thrust reverser door to stow, i.e. to return to its position prior to its being deployed to divert the air from the engine. When the at least one thrust reverser door returns to a stowed or undeployed position, a sensor may send a signal to the operator to signal this. The total time taken may be the time from a command being sent to stow the at least one thrust reverser door to the time the signal is received by the control system/operator. The time taken may then be compared to the expected time for such an operation to take place (i.e. from command to signal). Should the time taken be significantly greater than the expected time, this is indicative of the first check valve having failed. A similar system may be in place for the lock system, the second check valve, and the second return line.

In use, the first return line may be at a first return line pressure and the second return line may be at a second return line pressure, and the first and second return line pressures may be greater than external pressure, i.e. the pressure external to the TRAS.

The TRAS may include a supply of hydraulic fluid at a supply pressure, and an isolation control valve, wherein the isolation control valve can selectively isolate the supply pressure from both the piston system and the lock system of the TRAS.

The isolation control valve may have an open position and a closed position. When the isolation control valve is isolating the supply pressure from the piston system and the lock system, any leakage across the valve will be in fluid communication with the first return line or the second return line.

The TRAS may comprise a restrictor line for allowing fluid to flow between the first and second return lines, wherein a first end of the restrictor line is interconnected with the first return line at a location between ends of the first return line, and the second end of the restrictor line is interconnected with the second return line at a location between ends of the second return line, and wherein the restrictor is located in the restrictor line.

The ends of the first return line and second return line may refer to the first return line and the second return line each having first and second ends, the restrictor line being interconnected with each of the first return line and the second return line at locations between the first and second ends thereof.

The term "interconnected" refers to the lines being in direct connection and fluid communication with one another, for example at a T junction or a valve.

The TRAS may further comprise a third return line having a third check valve, wherein the third return line is in fluid communication with the first and second return lines via a second restrictor, wherein the restrictor and the second restrictor are upstream of the first, second and third check valves The system may include any number of return lines, each return line having an associated check valve, wherein each return line is in fluid communication with at least one other of the return lines via a restrictor upstream of the associated check valve (and thus, by definition, is in fluid communication to all of the return lines via some series of paths including restrictor upstream of the check valves The TRAS may further comprise at least one thrust reverser door controlled by the piston system, and at least one lock system configured for controlling a lock to selectively prevent the movement of the at least one thrust reverser door. The TRAS may comprise a single thrust reverser door. Alternatively, the TRAS may comprise two or more thrust reverser doors. The system may be configured such that the doors are controlled to move together, i.e. at the same time. The piston system may comprise a piston related to each thrust reverser door. The lock system may comprise a lock related to each thrust reverser door.

According to a second aspect of the invention, an aircraft may include the above described thrust reverser system. The aircraft may further comprise an engine and a nacelle, wherein—the at least one thrust reverser door forms a portion of the nacelle.

According to a third aspect of the invention, a hydraulic system may include a first return line having a first check valve therein, and a second return line having a second check valve therein, wherein the first return line and the second return line are in fluid communication via a restrictor upstream of the first and second check valves.

The invention also included methods of manufacturing or installing a TRAS as herein described.

BRIEF DESCRIPTION OF DRAWINGS

Various embodiments will now be described, by way of example only, and with reference to the accompanying drawings in which.

DETAILED DESCRIPTION

A hydraulic thrust reverser actuator system (TRAS) reverses airflow across the nacelle of an aircraft to aid braking. It is utilised when an aircraft has landed, i.e. on the ground. As a safety feature, such systems lock whilst the aircraft is in flight, i.e. such that they cannot accidentally be deployed.

Figure 1:
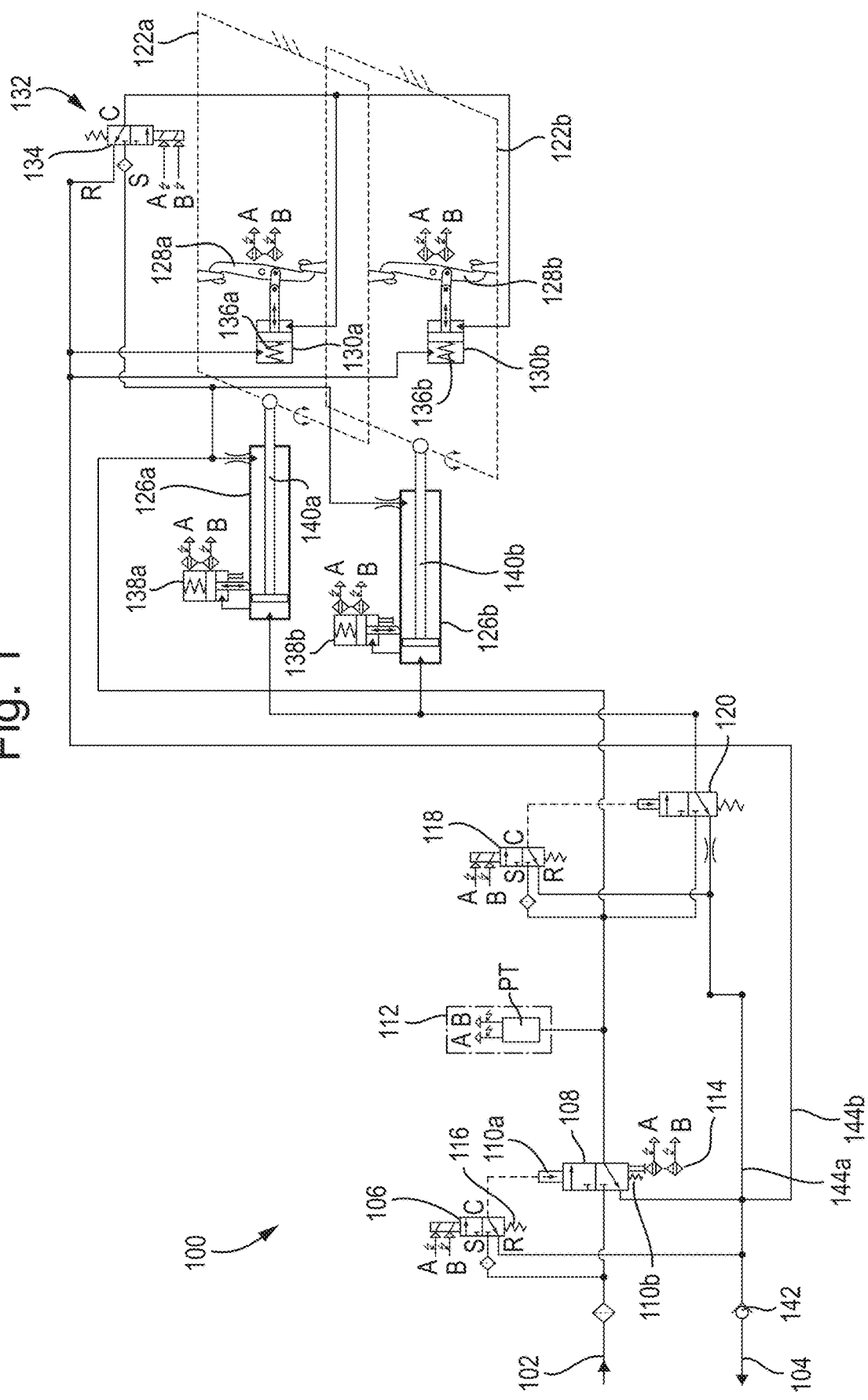
FIG. 1 shows a prior art thrust reverser actuation system.

FIG. 1 shows a prior art TRAS 100.

Inlet 102 supplies pressurised hydraulic fluid to the TRAS. Outlet 104 allows hydraulic fluid to exit the TRAS.

The TRAS 100 may include an Isolation Control Valve (ICV) 108, which may be controlled by an ICV enable solenoid 106, for isolating at least a portion of the TRAS from the pressurised hydraulic fluid supplied by the inlet 102. The TRAS 100 may also include a direction control valve (DCV) 120, which may be controlled by a DCV enable solenoid 118, for controlling whether or not the thrust is reversed.

The ICV 108 may be biased in one direction by an actuator 110a and in the opposing direction by a biasing spring 110b. The actuator 110a may be in selective communication with the inlet 102 via the ICV enable solenoid 106. The actuator and the biasing spring may be configured such that when the actuator 110a is in fluid communication with the inlet 102, the actuator 110a overpowers the biasing spring 110b, enabling the ICV to move as described below.

The ICV enable solenoid 106 can be in a first position or a second position. The position of the ICV enable solenoid 106 may be controlled by a current through the solenoid being switched on or switched off. The ICV enable solenoid 106 may be in the first position when the current is switched on and the second position when the current is switched off, or vice versa. In the first position, as shown in FIG. 1, the ICV enable solenoid 106 prevents the pressurised fluid from being in fluid communication with the actuator 110a of the ICV 108. This results in the ICV 108 being in a closed position. In the second position, the ICV enable solenoid 106 allows the pressurised fluid to be in fluid communication with the actuator 110a of the ICV 108, resulting in the ICV being moved to an open position (not shown). Alternatively, the solenoid may be configured in the opposite direction, i.e. such that when the ICV enable solenoid is in the first position, the ICV 108 is in the open position. In either arrangement, the solenoid may be biased in one direction, such as by a spring 116, to ensure it returns to the opposite position when the current is turned off. As the actuator 110a retracts, fluid drains to the outlet 104.

A manual inhibit switch 114 is a safety measure to allow a user to manually close the ICV, preventing the TRAS from operating. The manual inhibit switch may send a signal to an engine controller (not shown) that the TRAS cannot be used.

During quiescent periods (i.e. periods of inactivity or dormancy), the ICV Enable solenoid 106 may be in the first position, controlling the ICV 108 to be in a closed position, as shown in FIG. 1. However, leakage may occur across the ICV 108. This may be natural leakage through the valve, or due to clearances, as the valve may not be a zero leak valve. Any such leakage through the ICV 108 will flow to the outlet 104.

During periods of operation, the ICV enable solenoid 106 may be in the second position, which controls the ICV 108 to be in an open position (not shown). In this position of the ICV 108, the pressurised hydraulic fluid from the inlet is in fluid communication with the rest of the TRAS.

A pressure transducer 112 may monitor the pressure of the hydraulic fluid from the inlet 102 when the ICV 108 is in an open position.

The direction control valve (DCV) enable solenoid 118 may control the direction control valve (DCV) 120 in the same manner as the ICV enable solenoid 106 controls the ICV 108, and be biased in one direction by a spring. The DCV enable solenoid 118 may be controlled by the engine controller.

In the embodiment of FIG. 1, the engine thrust airflow is reversed by the rotation of two doors, upper door 122a and lower door 122b. The upper and lower doors 122a and 122b are rotated by the actuation of upper and lower door actuators 126a, 126b.

Primary locks 128a, 128b prevent the doors from inadvertently deploying, such as due to numerous failures in the system. The primary locks 128a,b are controlled by a primary lock controller 132, which controls primary lock actuators 130a,b. The primary lock controller 132 responds to electrical commands from the engine controller. The primary lock actuators 130a,b may biased towards locked positions by biasing springs 136a,b. This ensures that, in the event of loss of hydraulic pressure, the primary locks 128a,b close. Primary lock controller 132 may comprise a valve 134. When the valve 134 is open (and the ICV 108 is open), the hydraulic pressure (from the inlet 102) may overcome biasing springs 136a, 136b in the primary lock actuators 130a,b to release the primary locks 128a,b. The positions of the primary locks 128a,b may be monitored by proximity switches, which may send electrical signals to an engine controller.

As a further safety precaution, the upper and lower door actuators 126a, 126b each comprise an actuator lock 138a, 138b to prevent inadvertent deployment of the upper and lower doors in the event of loss of functionality of the primary locks 128a, 128b. The upper and lower actuator locks 138a, 138b may comprise pistons 140a,b biased towards a locked position by a biasing spring. When hydraulic pressure is applied to the head sides of the pistons 140a,b of the door actuators 126a,b, as will be discussed below, this may also provide hydraulic pressure to overcome the biasing springs of the actuator locks 138a,b to release the actuator locks. The positions of the actuator locks 138a,b may be monitored by proximity switches, which may send electrical signals to an engine controller.

When the DCV 120 is in a door closed position, pressurised hydraulic fluid from the inlet 102 is provided to the piston side of the pistons 140a,b.

When the DCV 120 is in a door open position, pressurised hydraulic fluid from the inlet 102 is provided to both the head side and the piston side of the pistons 140a,b. However, the pistons 140a,b are biased such that the pistons 140a,b will move to deploy the doors 122a,122b.

In operation, when the system is not in use (i.e. during quiescent times), the ICV 108 may be de-energised, such that the ICV 108 is in a closed position. The DCV 120 may also be de-energised, such that the DCV 120 is in a door closed position. In the door closed position, the thrust is not reversed. The primary lock controller 132 may also be de-energised, such that the primary lock valve 134 is in a closed position (i.e. the primary locks are on).

Energisation of the ICV (i.e. the ICV is moved to the open position) pressurises the upper and lower door actuators 126a,126b to be fully retracted (i.e. the pistons 140a,b are moved to the position where the upper and lower doors are fully closed). In this position, the upper and lower doors 122a,b may not be loading on the primary locks 128a,b, in preparation for the release thereof. The primary lock controller 132 is also pressurised. Thus, when the primary lock controller 132 is energised, and primary lock valve 134 is opened, the primary lock actuators 130a,b cause the primary locks 128a,b to unlock. Once the proximity switches monitoring the primary locks 128a,b signal that they are unlocked, the engine controller energises the DCV 120. Both sides of the pistons 140a,b are pressurised, causing the actuator locks 138a,b to release, and the pistons 140a,b to move, opening the upper and lower doors 122a,b to the thrust reverse position.

On completion of the engine reverse thrust operation, the engine controller de-energises the DCV 120, causing the pistons 126a,b to retract, and the upper and lower doors 122a,b to close. The actuator locks 138a,b lock. Once the proximity switches monitoring the actuator locks 138a,b signal that they are locked, the engine controller de-energises the primary lock controller 132, resulting in the primary locks 130a,b locking (as the hydraulic pressure is overcome by the biasing springs 136a,b). Once the proximity switches monitoring the primary locks 128a,b signal that they are locked, the engine controller de-energises the ICV 108. The pressure of the entire system can reduce to nominally zero (or ambient pressure) via the outlet 104. The upper and lower door actuators 126a,b can "relax", as the upper and lower doors 122a,b load the primary locks 128a,b and, in case of failure, the actuator locks 138a,b.

The system includes two return flow lines 144a, 144b. These flow lines allow for hydraulic fluid from the various components to return to the outlet 104. The outlet 104 includes a check valve 142, to ensure fluid only flows out of the outlet 104. The check valve 142 may be position directly at the outlet 104, or on a single flow line extending upstream thereof. If this check valve 142 fails during operation (for example by becoming blocked), this can cause problems, but can be detected by the system not functioning as expected. However, if the check valve fails during quiescent times, the leakage through the ICV 108 could cause the pressure in the TRAS to increase to the hydraulic pressure supplied by the inlet 102. This can damage the system, and cause accidental deployment of the thrust reversers, i.e. accidental movement of the upper and lower doors 122a,b.

Figure 2:
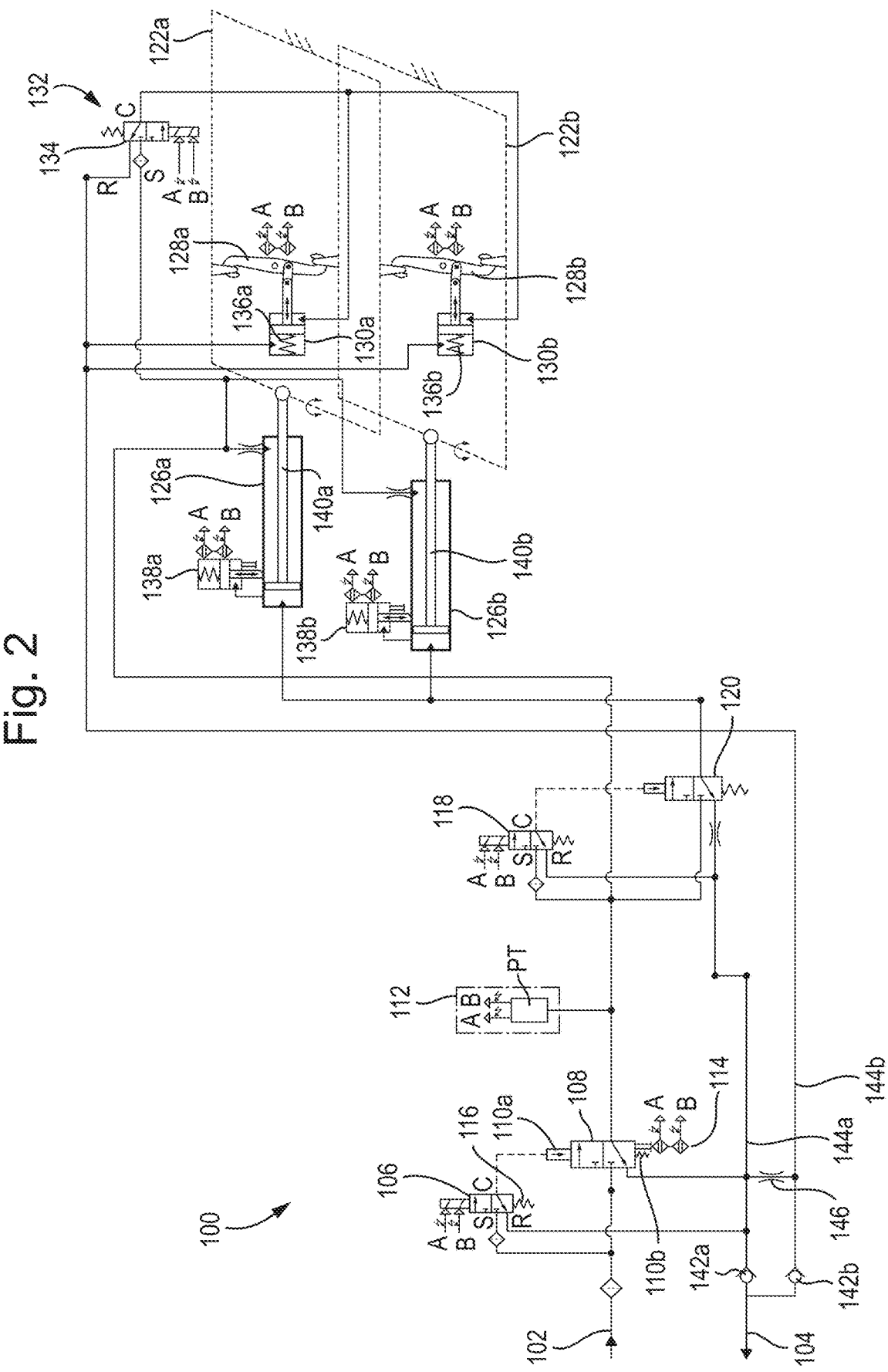
FIG. 2 shows an embodiment of a thrust reverser actuation system in accordance with the present invention.

FIG. 2 shows an embodiment of the present invention that is substantially the same as the system shown in FIG. 1, except that the outlet return lines 144a, 144b each include a check valve 142a,b. Downstream from the check valves 142a, 142b, the return lines 144a,144b both extend to the outlet 104. Upstream from the check valves 142a,b (i.e. on the opposite side to the outlet 104), the return lines 144a, 144b are in fluid communication via a flow restrictor 146. The flow restrictor 140 is located on a restrictor line 148, which interconnects with both the first and second return lines 144a, 144b at T junctions in an intermediate portion of each respective return line 144a, 144b (i.e. the interconnections are between first and second ends of the respective return lines). The flow restrictor 146 may be any suitable flow restrictor 146. For example, the flow restrictor may be a cartridge restrictor, an orifice plate restrictor, a calibrated restrictor, a high flow restrictor, or a low flow restrictor. The restrictor may comprise a narrower passage than that of each of the flow lines 144a,b. In use, when both check valves 142a,b, are fully functioning, there will be little fluid flow through the restrictor because most of the flow will flow along the non-restricted flow path through the respective check valve 142*a,b* to the outlet 104. However, if either check valve 142*a,b* fails, fluid in the respective return line 144*a,b* can flow to the outlet 104 via the flow restrictor 146 and the opposite check valve 142*a,b*. During operation of the TRAS 100, this will prevent a catastrophic build-up of pressure in the return line having the failed check valve. However, due to the restriction on the flow, the respective system will function more slowly, as the fluid will only be able to flow from the system to the outlet at a reduced rate, due to the restriction on the flow by the flow restrictor. For example, if the fluid in question is flowing from one side of a piston, the flow will occur more slowly, thus causing the piston to move at a slower rate than usual. Therefore, this is a detectable failure, i.e. a user or operator would be aware of the failure of the check valve. A control system and/or an operator may monitor the time taken for the at least one thrust reverser door to stow, i.e. to return to its position prior to its being deployed to divert the air from the engine. When the at least one thrust reverser door returns to a stowed or undeployed position, a sensor may send a signal to the operator to signal this. The total time taken may be the time from a command being sent to stow the at least one thrust reverser door to the time the signal is received by the control system/operator. The time taken may then be compared to the expected time for such an operation to take place (i.e. from command to signal). Should the time taken be significantly greater than the expected time, this is indicative of the first check valve having failed. A similar system may be in place for the lock system, the second check valve, and the second return line.

During quiescent times, this will ensure that the system does not over pressurise if a check valve fails.

The invention claimed is:

1. A hydraulic thrust reverser system (TRAS) including:
   a first return line having a first check valve therein; and
   a second return line having a second check valve therein;
   wherein the first return line and the second return line are in fluid communication with each other via a fluid restrictor located upstream of the first and second check valves;
   wherein the first return line extends from a piston system of the TRAS, the piston system being for moving at least one thrust reverser door; and
   wherein the second return line extends from a lock system of the TRAS, the lock system being for controlling locks to selectively prevent the movement of the at least one thrust reverser door.

2. The TRAS of claim 1, wherein the fluid restrictor is a fluid line having a bore therethrough for transmitting fluid between the first and second return lines, wherein at least a portion of a length of said bore has a smaller diameter than: a minimum diameter of a bore through the first return line; and/or a minimum diameter of a bore through the second return line.

3. The TRAS of claim 1, wherein the first return line and the second return line are additionally in fluid communication downstream of the first and second return line check valves.

4. The TRAS of claim 3, wherein the first return line and the second return line converge to an outlet.

5. The TRAS of claim 1, configured so that, in use, the first return line is at a first return line pressure and the second return line is at a second return line pressure, and the first and second return line pressures are greater than ambient pressure.

6. The TRAS of claim 1, wherein the TRAS includes a supply of hydraulic fluid at a supply pressure, and an isolation control valve, wherein the isolation control valve is configured to selectively isolate the supply pressure from both the piston system and the lock system of the TRAS.

7. The TRAS of claim 1, further comprising:
   a restrictor line for allowing fluid to flow between the first and second return lines, wherein a first end of the restrictor line is interconnected with the first return line at a location between ends of the first return line, and a second end of the restrictor line is interconnected with the second return line at a location between ends of the second return line, and wherein the restrictor is located in the restrictor line.

8. The TRAS of claim 1, wherein said at least one thrust reverser door controlled by the piston system, and
   wherein said one lock system is configured to control a lock to selectively prevent the movement of the at least one thrust reverser door.

9. An aircraft including the TRAS of claim 8, wherein the aircraft further comprises:
   an engine and a nacelle, wherein the at least one thrust reverser door forms a section of the nacelle.

* * * * *